United States Patent [19]

Laciak et al.

[11] 4,140,391

[45] Feb. 20, 1979

[54] EXPOSURE TIME CONTROL

[75] Inventors: Francis M. Laciak, Brooklyn Park; John Poné, Jr., Minneapolis, both of Minn.

[73] Assignee: PAKO Corporation, Minneapolis, Minn.

[21] Appl. No.: 848,736

[22] Filed: Nov. 4, 1977

[51] Int. Cl.² .............................................. G03B 27/78
[52] U.S. Cl. ........................................ 355/38; 355/68; 355/77
[58] Field of Search .................................. 355/35–38, 355/67–71, 83, 88, 77; 354/23 D, 60 A

[56] References Cited

U.S. PATENT DOCUMENTS 3,504,971  4/1970  McCune ................................ 355/38
3,992,098  11/1976  Wirtz ..................................... 355/68

Primary Examiner—L. T. Hix
Assistant Examiner—W. J. Brady
Attorney, Agent, or Firm—Kinney, Lange, Westman and Fairbairn

[57] ABSTRACT

An improved exposure time control for a photographic printer includes a digital processor such as a microprocessor. The digital processor receives input signals such as signals from large area transmission density (LATD) sensors, from density or color sensors, and from an operator control panel. Based upon the input signals, the digital processor derives a digital count and a clock control signal for each color channel. The exposure of each color channel is controlled as a function of the time required to change the corresponding digital count from its initial value to a predetermined final value. The changing of the digital count for each channel is caused by the digital processor in response to clock or interrupt signals from variable clocks controlled by the clock control signals. The rates at which the interrupt signals are generated are controlled by the clock control signals.

13 Claims, 3 Drawing Figures

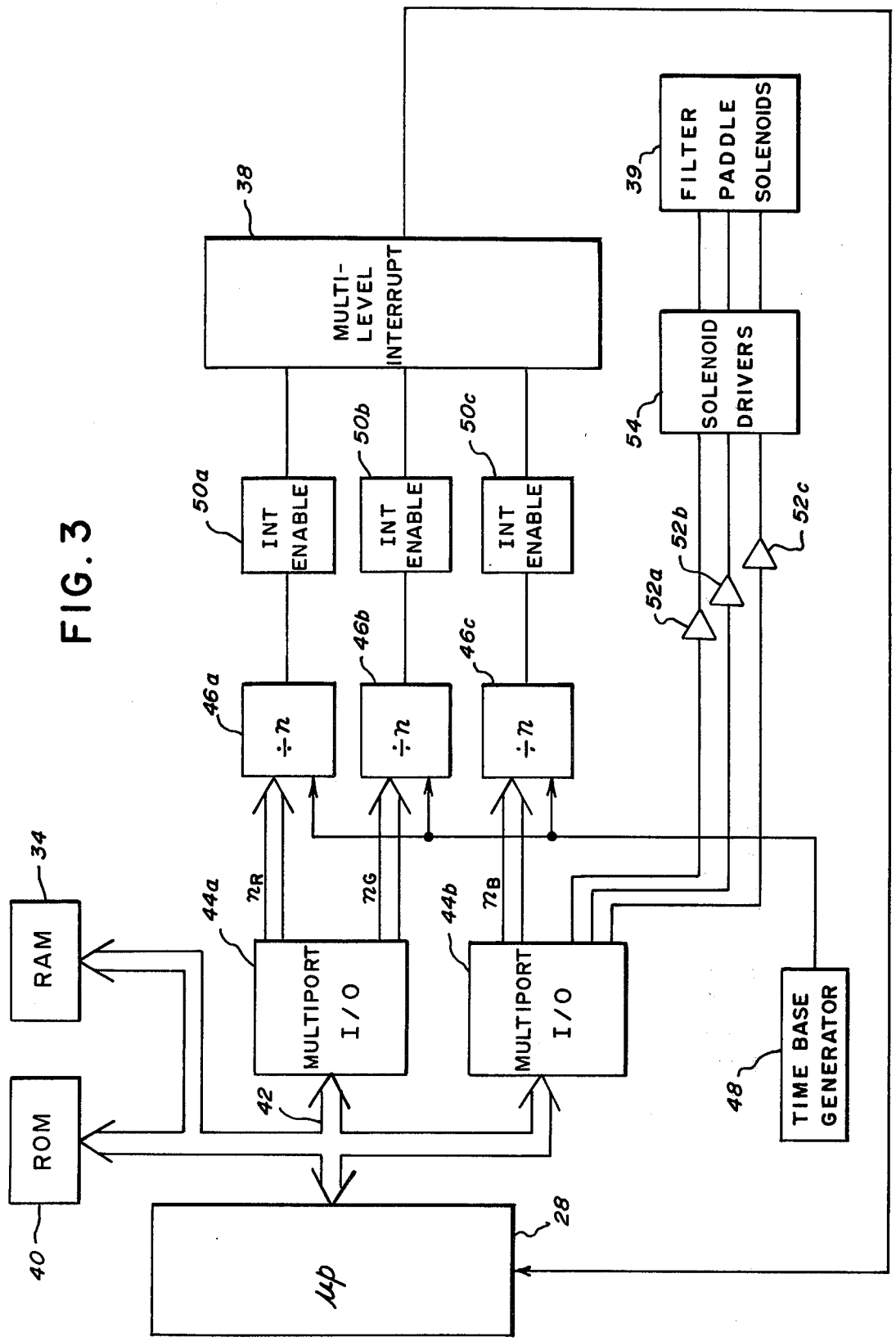

EXPOSURE TIME CONTROL

REFERENCE TO CO-PENDING APPLICATIONS

Reference is made to co-pending applications by J. Poné entitled "Photographic Printer with Automatic Density and Color Corrections for Paper Gamma"; by J. Poné and P. Seidel entitled "Photographic Printer with Automatic Slope Compensation"; and by J. Poné entitled "Photographic Printer with Interactive Color Balancing" which were filed on even date and are assigned to the same assignee as the present application. These co-pending applications describe photographic printing systems which may use the exposure time control of the present invention.

BACKGROUND OF THE INVENTION

The present invention relates to photographic printing systems. In particular, the present invention is an improved method and apparatus for controlling exposure times.

Photographic printers produce color or black and white prints or transparencies from photographic film originals (generally negatives). High intensity light is passed through the film and imaged on the photosensitive print medium (film or paper). The photographic emulsion layer on the print paper or film is exposed and subsequently processed to produce a print or transparency of the scene contained in the original.

In order to increase efficiency and minimize time required to fill customer orders, high speed printers have been developed in which many exposures are made on a single roll of print paper. After the exposures are made, the roll is removed from the printer, is photoprocessed to produce prints, and is cut into individual prints. The prints are then sorted by customer order and ultimately packaged and sent to the customer.

A critical portion of a photographic printer is the exposure time control, which controls the duration of the exposure of the photosensitive medium in order to assure that the image on the photosensitive medium is properly exposed. The exposure time control may utilize inputs from several different sources in order to determine the proper duration of the exposure. For example, most automatic printers use large area transmission density (LATD) sensors to sample the light transmitted by the negative either prior to or during the exposure. Control of the exposure time is determined using a method known as "integration to grey". In addition, many automatic printers include an automatic density correction (ADC) or color scanning station which scans the negative prior to printing and corrects the exposure time in the event of an abnormality in illumination of the negative known as "subject failure". Finally, the operator may enter density or color correction signals from the operator control panel. Based upon some or all of these input signals, the exposure time control determines the proper exposure time for each of the color channels or for one black and white channel.

The significant advances in digital electronics and digital computers in recent years has led to the development of computer control of photographic printers. One of the functions controlled by the computer (which has typically been a minicomputer) is the exposure time control function. In the past, a significant amount of computing time has been dedicated to the control of the exposure time.

SUMMARY OF THE INVENTION

The present invention is an improved exposure time control which uses a digital processor, but which reduces the amount of processing time used by the digital processor in controlling the exposure time. In the present invention, the digital processor derives, from input signals, a digital count for each channel and a clock control signal for each channel. Storage means stores the digital counts, and variable clock means provide clock (or interrupt) signals at rates determined by the clock control signals. The digital processor changes the digital counts for each of the color channels from their initial values in response to the clock signals. The exposure time of each color channel is controlled as a function of the time required to change each corresponding digital count from its initial value to a predetermined final value.

BRIEF DESCRIPTION OF THE DRAWINGS

FIG. 3 is a block diagram of a preferred embodiment of a portion of the exposure time control of FIG. 2.

DETAILED DESCRIPTION OF THE PREFERRED EMBODIMENTS

Figure 1:
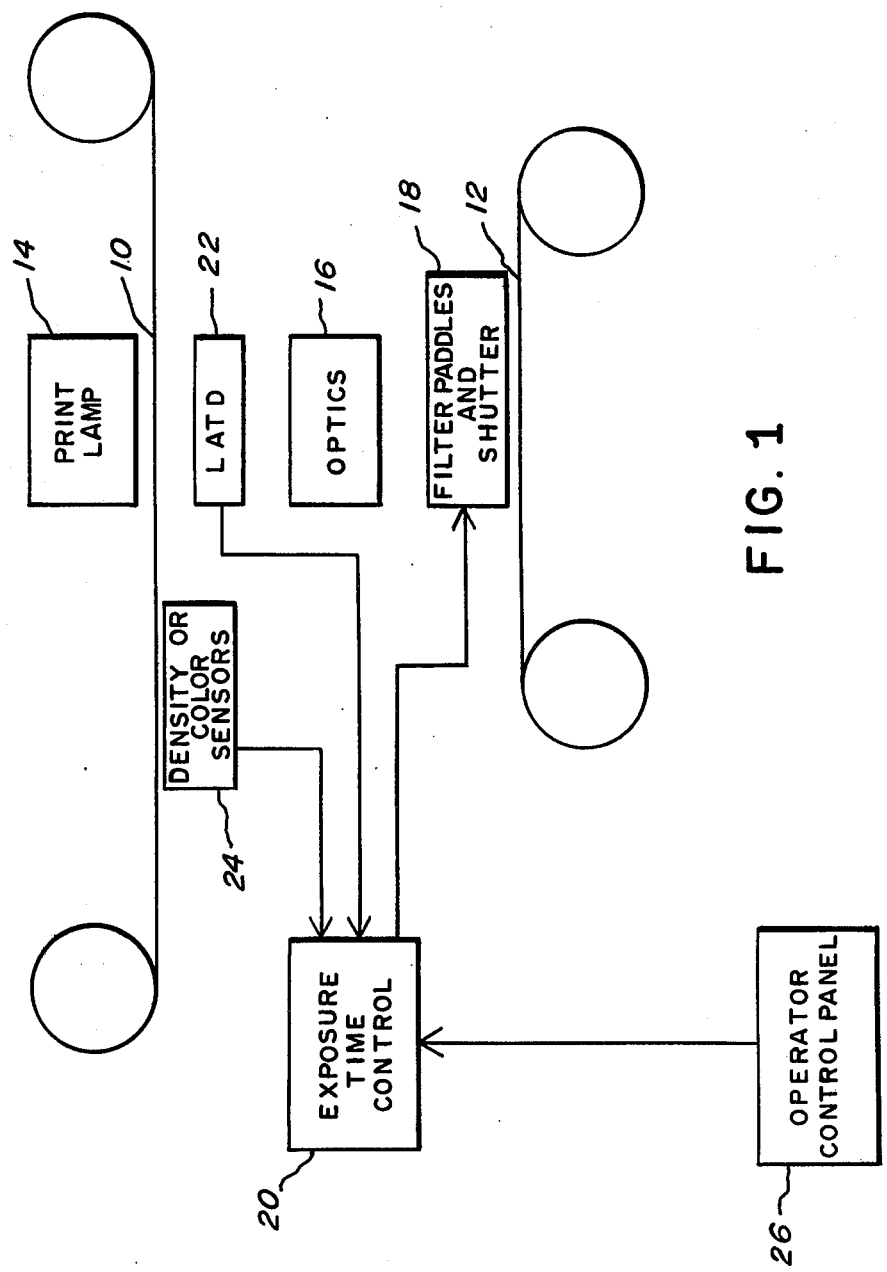
FIG. 1 is a system block diagram of a photographic printer.

FIG. 1 is a block diagram illustrating a photographic printer. In the printer, an image contained in film 10 is printed onto photosensitive paper 12. Light from print lamp 14 is passed through a frame of film 10 and is focused by optics 16 onto an appropriate portion of paper 12.

The exposure time during which paper 12 is exposed to the image from film 10 is determined by the position of filter paddles and shutter 18. The filter paddles typically include a subtractive filter for each color channel (red, blue, and green). Filter paddles and a shutter 18 are controlled by exposure time control 20.

In the embodiment shown in FIG. 1, exposure time control 20 receives input signals from LATD sensors 22, from density or color sensors 24, and from operator control panel 26. Not all of these sources of input signals are required in every system, and similarly, other sources of input signals which affect the exposure time may be used in the printer.

Figure 2:
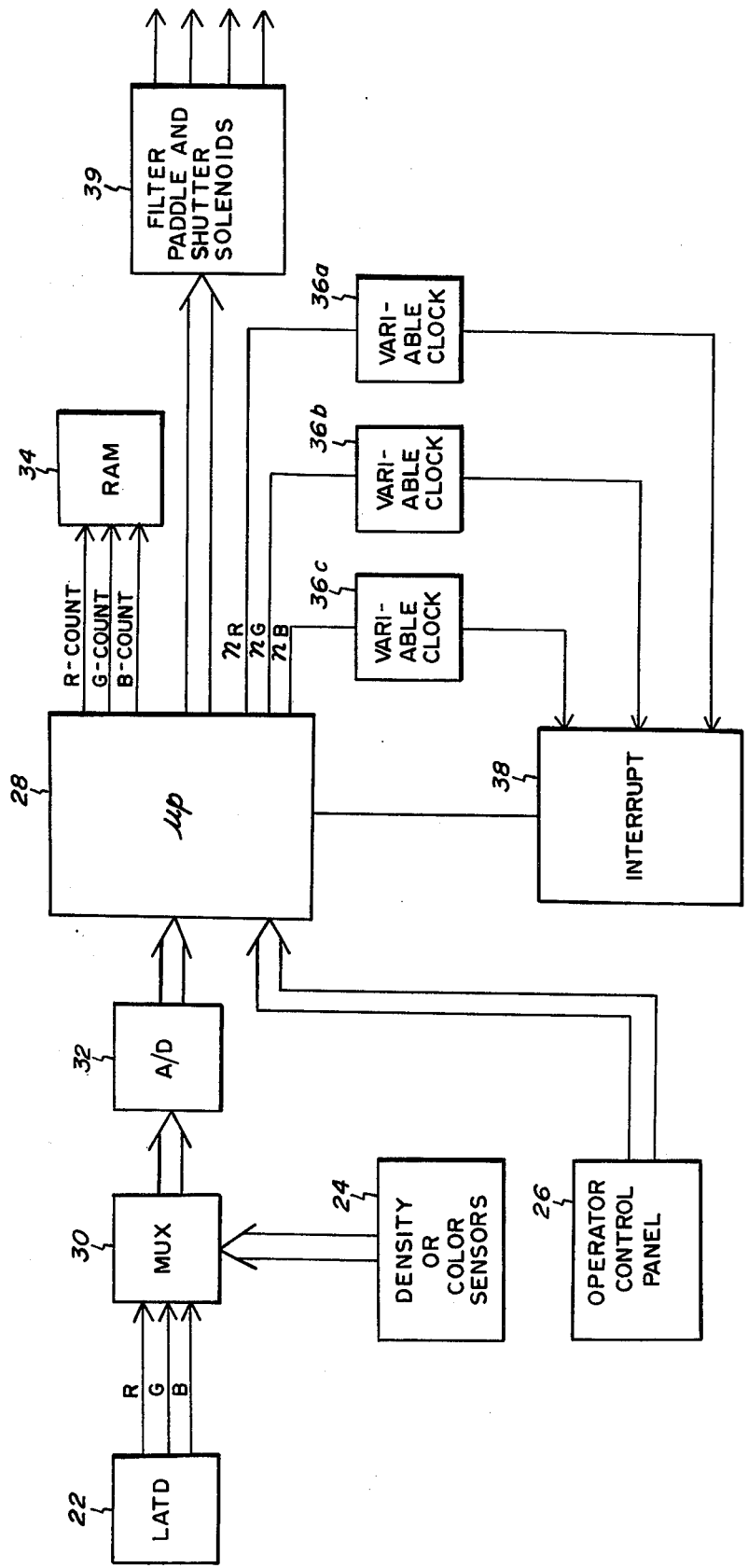
FIG. 2 is a block diagram of a preferred embodiment of the exposure time control of the present invention.

FIG. 2 shows a preferred embodiment of the exposure time control of the present invention. The control system includes a digital processor 28, which is preferably a microprocessor such as the Intel 8080A. Analog signals from the LATD sensors 22 and the sensors 24 are multiplexed by multiplexer 30. The analog signals are converted to digital signals by A/D converter 32, and supplied as input signals to microprocessor 28. Input signals from the operator control panel 26 are also received by microprocessor 28. In one preferred embodiment, the red, green, and blue signals from the LATD sensors are each converted by A/D converter 32 into 12-bit digital signals, as are the signals from density or color sensors 24 for individually measured segments of the film.

Based upon the input signals from A/D converter 32 and operator control panel 26, microprocessor 28 generates a digital count and a clock control signal for each color channel. The red, green, and blue digital counts are each stored in random access memory (RAM) 34.

The clock control signals are preferably digital numbers $n_R$, $n_G$, and $n_B$, which are supplied to variable clocks 36a, 36b, and 36c.

The clock signals from variable clock 36a–36c are generated at rates determined by the value of $n_R$, $n_G$, and $n_B$. The output signals of clocks 36a–36c are supplied to multilevel interrupt circuit 38, which supplies interrupt signals to microprocessor 28 as a function of the clock signals.

Each time microprocessor 28 receives an interrupt signal, it changes the appropriate count in random access memory 34. When the count of a particular color channel has been decremented to zero, microprocessor 28 energizes the appropriate one of the filter paddle solenoids 39, thereby terminating the exposure in that color channel.

FIG. 3 shows a more detailed block diagram of one preferred embodiment of a portion of the exposure time control. In this embodiment, read only memory (ROM) 40 is provided in addition to random access memory 34. Connected to the data/address/control bus 42 are two multiport I/O circuits 44a and 44b. Divide-by-n counters 46a and 46b receive numbers $n_R$ and $n_G$ from multiport I/O circuit 44a, while divide-by-n counter 46c receives number $n_B$ from multiport I/O circuit 44b. Counters 46a, 46b, and 46c, together with common time base generator 48 perform the functions of variable clocks 36a, 36b and 36c, respectively, shown in FIG. 2.

The carry outputs of counters 46a, 46b and 46c are supplied to interrupt enable circuits 50a, 50b and 50c. The outputs of interrupt enable circuits 50a–50c are supplied to multilevel interrupt circuit 38, which supplies interrupt signals to microprocessor 28.

Multiport I/O circuit 44b also provides three outputs which are supplied through buffers 52a, 52b and 52c to solenoid drivers 54. Filter paddle solenoids 39 are driven by solenoid drivers 54.

In a preferred embodiment of the present invention, the three digital counts supplied to RAM 34 are in the range of 50–99. The numbers $n_R$, $n_G$, and $n_B$, which control the rate at which interrupt signals are supplied, are in the range of 0 to 256, and common time base generator 48 provides a time base of 1 millisecond. The interval between interrupts for a particular color channel, therefore, can range from 1 to 256 milliseconds, depending on the value of $n_R$, $n_G$, or $n_B$.

Each time multilevel interrupt 38 supplies an interrupt signal to microprocessor 28, the appropriate digital count in RAM 34 is decremented by microprocessor 28. The exposure time for each color channel is determined by the time required to decrement the digital count in RAM 34 for that color channel from its initial value to zero (or some other predetermined final value). When zero is reached, microprocessor 28 provides a signal through multiport I/O circuit 44b to one of the solenoid drivers 54, thereby terminating the exposure in that color channel.

The present invention allows great flexibility in the making of corrections to the exposure times for each color channel. The initial count of between 50 and 99 is a base count which can be modified at any time during the exposure by simply increasing or decreasing the count. For example, in one preferred embodiment of the present invention, filter paddle compensation is provided each time one of the filter paddles is driven into the light path to terminate the exposure in a particular color channel. The filter paddle compensation is achieved by microprocessor 28 by increasing the digital counts contained in RAM 34 for the remaining color channel or channels. This increase in the digital counts, and therefore the increase in exposure time, compensates for the unwanted absorption in the remaining color channels by the filter paddle which has just been driven into the light path.

The digital counts for each color channel and the clock control numbers for each channel can be derived in many different ways depending upon the particular input signals supplied to microprocessor 28. In one preferred embodiment, the determination of the digital counts and the clock control numbers is based upon the premise that the intensity times the time that the photosensitive medium is exposed must be a constant regardless of the density of the film negative. In other words, the less intensity of the light, the longer the exposure time must be. Since the density of the negative to be printed is measured by LATD sensors 22, since the total time-intensity product desired for the particular photosensitive medium is known, and since the time base and the permissible range of values of the digital counts and the clock control numbers are specified, it is possible to derive the digital count and clock control number for each color based upon the LATD signals for that color. Any other corrections to exposure time, such as required by signals from density or color sensors 24 or operator control panel 26 may be used to modify either the digital counts or the clock control numbers, or both.

In one preferred embodiment of the present invention, the digital signals from LATD sensors 22, density or color sensors 24 and operator control panel 26, are converted to modified $\log_2$ values by multiplying the $\log_2$ of the reciprocal of the LATD signal by a constant (which is a scaling factor). The use of $\log_2$ values permits easy handling of the signals by simple addition and subtraction rather than multiplication. After the red, green, and blue LATD signals have been corrected based on values from density or color sensors or operator control panel signals, or by other corrections required by the printer, a modified antilog is taken of the corrected value. The antilog consists of two digital numbers for each color channel. One number is the digital count and the other is the clock control number n. The digital count is supplied to RAM 34 and stored, and the clock control count is supplied to one of the multiport I/O circuits 44a or 44b and is used to control the rate of clock signals generated by counters 46a–46c.

An important advantage of the present invention is that the clock or interrupt rate is independent for each channel. In addition, independent optimization of the rates for each of the color channels is possible. The microprocessor is not burdened, therefore, with extremely long counts and the updating which is required for those long counts.

If all three color channels normally terminated in "dead heat" (i.e., at the same time), only one clock operating at a given rate for all three channels would be necessary. In practice, however, the channels do not generally finish in "dead heat". If a single time base were provided for all three channels, therefore, it would have to be of extremely fine resolution. As a result, the microprocessor would be burdened with extremely long counts which would take up a significant portion of the microprocessor's time simply to update and change counts.

With the present invention, on the other hand, the microprocessor is free to perform calculations for the next exposure or to perform other machine control functions. This allows a system of the present invention in many cases to utilize a microprocessor rather than a minicomputer to control exposure time.

In conclusion, the exposure time control of the present invention represents a significant improvement over the prior art exposure control systems. It permits the use of a microprocessor to perform all of the exposure time control functions and calculations without overburdening the microprocessor with an extremely fine time base. Although the present invention has been described with reference to preferred embodiments, workers skilled in the art will recognize that changes may be made in form and detail without departing from the spirit and scope of the present invention.

What is claimed is:

1. In a photographic printer, an exposure control comprising:
    input signal source means for providing input signals which affect exposure times;
    digital processor means for deriving, from the input signals, a digital count and a digital clock control signal for each color channel;
    storage means for storing the digital counts;
    variable clock means for providing clock signals for each color channel to the processor means at a rate determined by the digital clock control signal for the corresponding color channel, the clock signals causing the digital processor means to change the digital counts from their initial values; and
    means for controlling exposure of each color channel as a function of the time required to change the digital count for that color channel from its initial value to a predetermined final value.

2. The exposure control of claim 1 wherein the input signal source means comprises:
    sensor means for providing input sensor signals indicative of measured optical characteristics of a film segment to be printed.

3. The exposure control of claim 2 wherein the sensor means comprises:
    large area transmission density sensing means for each color channel.

4. The exposure control of claim 3 wherein the sensor means further comprises:
    density or color measurement means for reading defined areas of the film segment prior to printing.

5. The exposure control of claim 2 wherein the input signal source means further comprises:
    multiplexer means for multiplexing the input sensor signals; and
    A/D converter means for converting the input sensor signals from analog to digital signals.

6. The exposure control of claim 2 wherein the input signal source means further comprises:
    operator control means for providing input operator control signals.

7. The exposure control of claim 1 wherein the variable clock means comprises:
    time base generator means for providing a common time base signal; and
    counter means for each color channel, each counter means receiving the common time base signal and the digital clock control signal for that color channel and producing the clock signal for that color channel.

8. The exposure control of claim 7 wherein the digital clock control signals are digital numbers n, and the counter means are divide-by-n counters.

9. The exposure control of claim 1 and further comprising:
    multilevel interrupt means for supplying to the digital processor means, in response to the clock signals for each color channel, interrupt signals which cause the digital processor means to change the digital counts of the corresponding color channels.

10. The exposure control of claim 1 wherein the means for controlling exposure comprises:
    filter means for each color channel for terminating exposure of that color channel; and
    filter driver means for driving the filter means in response to signals from the digital processor means.

11. The exposure control of claim 10 wherein the digital processor means changes the digital counts of color channels whose exposures are not completed when a filter means terminates exposure of one of the color channels, the changes of digital counts compensating for unwanted absorption of light of the color channels whose exposures are not completed.

12. A method of controlling exposure times in a photographic printer, the method comprising:
    providing a density signal indicative of measured density of a negative;
    providing a digital clock control signal which is a function of the density signal;
    providing a digital count which is a function of the density signal;
    producing clock signals at a rate determined by the digital clock control signal;
    changing the digital count as a function of the clock signals; and
    controlling exposure time as a function of the time required to change the digital count to a predetermined value.

13. A method of controlling exposure times of color channels in a photographic printer, the method comprising:
    measuring optical characteristics of a photographic film;
    producing, as a function of the results of the measuring, first and second digital signals for each color channel which determine a number and a rate, respectively;
    counting the number determined by the first digital signal at the rate determined by the second digital signal for each color channel; and
    controlling exposure time of each color channel as a function of the time required to complete counting the number at the rate for that color channel.

* * * * *